United States Patent
Abe et al.

(10) Patent No.: US 8,077,818 B2
(45) Date of Patent: Dec. 13, 2011

(54) RADIO RECEIVER

(75) Inventors: Katsuaki Abe, Kanagawa (JP); Akihiko Matsuoka, Kanagawa (JP); Kentaro Miyano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 724 days.

(21) Appl. No.: 12/094,993

(22) PCT Filed: Nov. 21, 2006

(86) PCT No.: PCT/JP2006/323215
§ 371 (c)(1),
(2), (4) Date: May 26, 2008

(87) PCT Pub. No.: WO2007/063745
PCT Pub. Date: Jun. 7, 2007

(65) Prior Publication Data
US 2009/0116594 A1   May 7, 2009

(30) Foreign Application Priority Data
Dec. 1, 2005 (JP) .................................. 2005-348414

(51) Int. Cl.
*H04B 1/10* (2006.01)
(52) U.S. Cl. ........ 375/350; 329/323; 329/324; 329/358; 329/359; 342/100; 455/147; 455/208; 455/255; 455/265; 379/340
(58) Field of Classification Search .................. None
See application file for complete search history.

(56) References Cited

U.S. PATENT DOCUMENTS

| | | | |
|---|---|---|---|
| 6,385,262 B1 | 5/2002 | Gustafsson | |
| 2002/0037060 A1 | 3/2002 | Kishi | |
| 2003/0031281 A1 | 2/2003 | Gray | |
| 2003/0040294 A1 | 2/2003 | Staszewski | |
| 2007/0092018 A1* | 4/2007 | Fonseka et al. | 375/265 |

FOREIGN PATENT DOCUMENTS

| | | |
|---|---|---|
| JP | 7-254842 | 10/1995 |
| JP | 2002-076975 | 3/2002 |
| JP | 2003-133909 | 5/2003 |
| WO | 99/34625 | 7/1999 |

OTHER PUBLICATIONS

International Search Report dated Feb. 27, 2007.
K. Muhammad, et al., Digital RF Processing:Toward Low-Cost Reconfigurable Radios, Communications Magazine, IEEE, vol. 43, Issue.8, Aug. 2005, pp. 108-113.
Staszewski, et al. "All-Digital TX Frequency Synthesizer and Discrete-Time Receiver for Bluetooth Radio in 130-nm CMOS," IFEE Journal of Solid-State Circuits, vol. 39, No. 12, Dec. 2004, pp. 2278-2291.

* cited by examiner

*Primary Examiner* — David C. Payne
*Assistant Examiner* — Adolf Dsouza
(74) *Attorney, Agent, or Firm* — Dickinson Wright PLLC

(57) ABSTRACT

A radio receiver including a reception processing system that uses discrete-time frequency conversion to acquire a signal having a sampling rate corresponding to a local frequency, wherein the reception characteristic is improved when the reception processing system is applied to a system having a wide reception channel band. The radio receiver comprises an A/D converting part that quantizes a discrete-time analog signal to a digital value to output a received digital signal; a channel selection filtering part that uses a tap coefficient value to perform a digital filtering process of the received digital signal; and a frequency response characteristic correcting part that generates the tap coefficient in accordance with the sampling rate.

8 Claims, 8 Drawing Sheets

RADIO RECEIVER

TECHNICAL FIELD

The present invention relates to a radio receiver that samples a high frequency signal at discrete times to perform a discrete time process on the subsequent stage.

BACKGROUND ART

In order to reduce the size and power consumption of a radio receiver or integrate an analog signal processor with a digital signal processor, a configuration that directly samples a high frequency signal at discrete times to perform a discrete time process on the subsequent stage has been proposed (for example, Non-Patent Document 1). This configuration is expected to reduce the design complexity of a continuous-time analog process according to the related art.

Hereinafter, an example of the configuration and operation of a radio receiver using the discrete time process according to the related art will be described with reference to FIG. 1.

Analog RF signals received by antenna 10 are amplified by low noise amplifying section (LNA) 20. The amplified analog RF signals are converted into low frequency signals and discrete time analog signals by DISCRETE TIME FREQUENCY CONVERTER 30. At this time, conversion is performed with a sampling rate, which determines a discrete time interval, low enough to process the signal in the subsequent stage.

Specifically, sampling mixer 31 mixes a local signal with a frequency $f_{LO}$ supplied from LOCAL FREQUENCY OSCILLATOR 40 with the signal outputted from low noise amplifying section 20 to convert the frequency of the received analog RF signal and also convert the continuous-time signal into a discrete time signal.

The obtained discrete time signal has a sampling rate equivalent to the local frequency $f_{LO}$, which causes a large load to be applied to the subsequent stage. Therefore, DECIMATOR 32 decimates the sampling value to lower the sampling rate. In addition, although not shown in the drawings, it goes without saying that the influence of aliasing distortion generated due to the decimation should be removed in the previous stage.

The discrete time analog signal decimated to a sampling rate of $f_{LO}/N$ is quantized by A/D CONVERTER 50 at the sampling rate of $f_{LO}/N$ to be converted into a digital value. Then, DIGITAL RECEIVING PROCESSOR 60 in the subsequent stage performs predetermined reception processes, such as demodulation and decoding processes, on the digital signal, and outputs the processed signal as received data.

By converting the received analog RF signal into a discrete time signal and performing discrete time signal processing on the discrete time signal in this way, it is possible to apply a digital signal processing design, and thus it is possible to reduce the complexity of an analog circuit according to the related art. As a result, it is possible to easily design a radio receiver and reduce the size thereof.

FIG. 1 shows a general configuration example of a radio receiver and according to required specifications of a radio communication system used, a filter may be inserted in previous stage of low noise amplifying section 20 or a delta-sigma (ΔΣ) A/D CONVERTER may be used as A/D CONVERTER 50.

Non-Patent Document 1 discloses a configuration in which a processing section corresponding to DECIMATOR 32 has the filtering effect by discrete time charge movement.

Non-patent Document 1: R. B. Staszewski, et al., "All-Digital TX Frequency Synthesizer and Discrete time Receiver for Bluetooth Radio in 130 n-nm CMOS", IEEE Journal of Solid-State Circuits, VOL. 39, NO. 12, December 2004 (pp. 2284 to 2287, and FIG. 12 to FIG. 16)

DISCLOSURE OF INVENTION

Problems to be Solved by the Present Invention

However, the above-mentioned related art has the following problems.

That is, when the radio receiver having the discrete time processing configuration according to the related art, as shown in FIG. 1, is applied to a system having a wide channel frequency band, the sampling rate of the discrete time signal outputted from DISCRETE TIME FREQUENCY CONVERTER 30 varies depending on the received channel frequency. Strictly, the sampling rate of the discrete time signal outputted from DISCRETE TIME FREQUENCY CONVERTER 30 varies depending on the local frequency used on frequency conversion.

Here, it is assumed that the radio receiver shown in FIG. 1 is used as a receiving system that receives broadcasting signals in the TV UHF band, which has the received channel frequency band of 470 MHz to 770 MHz. It is also assumed that the frequency of a received signal is directly converted into a baseband (so-called Zero-IF band) and DECIMATOR 32 uses a fixed decimation rate N=1/32.

In this case, when the received channel frequency is 473 MHz, a sampling rate of 14.78125 MHz is obtained. When the received channel frequency is 767 MHz, a sampling rate of 23.96875 MHz is obtained.

When the obtained sampling rate varies according to the received channel frequency as described, A/D CONVERTER 50 in the subsequent stage needs to perform a process corresponding to the variation. For example, A/D CONVERTER 50 needs to sample with a quantization sampling rate, in correspondence with the sampling rate that varies according to the received channel frequency. Alternatively, if the quantization sampling rate is constant regardless of the received channel frequency, the previous or subsequent stage of A/D CONVERTER 50 needs to perform a filtering process to remove aliasing distortion components caused by mismatch between the quantization sampling rate and the sampling rate of an input discrete time signal.

Further, as disclosed in Non-Patent Document 1, in the configuration in which the filtering effect is obtained in a processing section corresponding to DECIMATOR 32, since the frequency response characteristic of the filtering are based on the sampling rate used for a discrete time process, the filtered frequency response characteristic also vary according to the received channel frequency. As a result, the out-off characteristics of interfering waves out of a receiving band or the received signal spectrum in the receiving band may be affected. However, Non-Patent Document 1 discloses no solution for such problems.

An object of the present invention is to provide a radio receiver that includes a receiving processing system that performs discrete time frequency conversion to obtain signals of a sampling rate in accordance with a local frequency, and capable of improving reception characteristics when the receiving processing system is applied to a system having a wide received channel band.

Means for Solving the Problem

According to an aspect of the present invention, a radio receiver includes: a DISCRETE TIME FREQUENCY CON- VERTER that outputs a discrete time analog signal with a sampling rate matching a local frequency by sampling a received signal at discrete times using the local frequency signal and performing frequency conversion and a puncturing process; an analog-to-digital converting section that quantizes the discrete time analog signal into a digital value and outputs a received digital signal; a FREQUENCY RESPONSE CHARACTERISTIC CORRECTOR that generates a tap coefficient value matching the sampling rate; and a digital filtering section that performs a digital filtering process on the received digital signal using the tap coefficient value.

Advantageous Effect of the Invention

According to the present invention, it is possible to provide a radio receiver that includes a receiving processing system that performs discrete time frequency conversion to obtain signals of a sampling rate in accordance with a local frequency, and capable of improving reception characteristics when the receiving processing system is applied to a system having a wide received channel band.

BEST MODE FOR CARRYING OUT THE INVENTION

Figure 1:
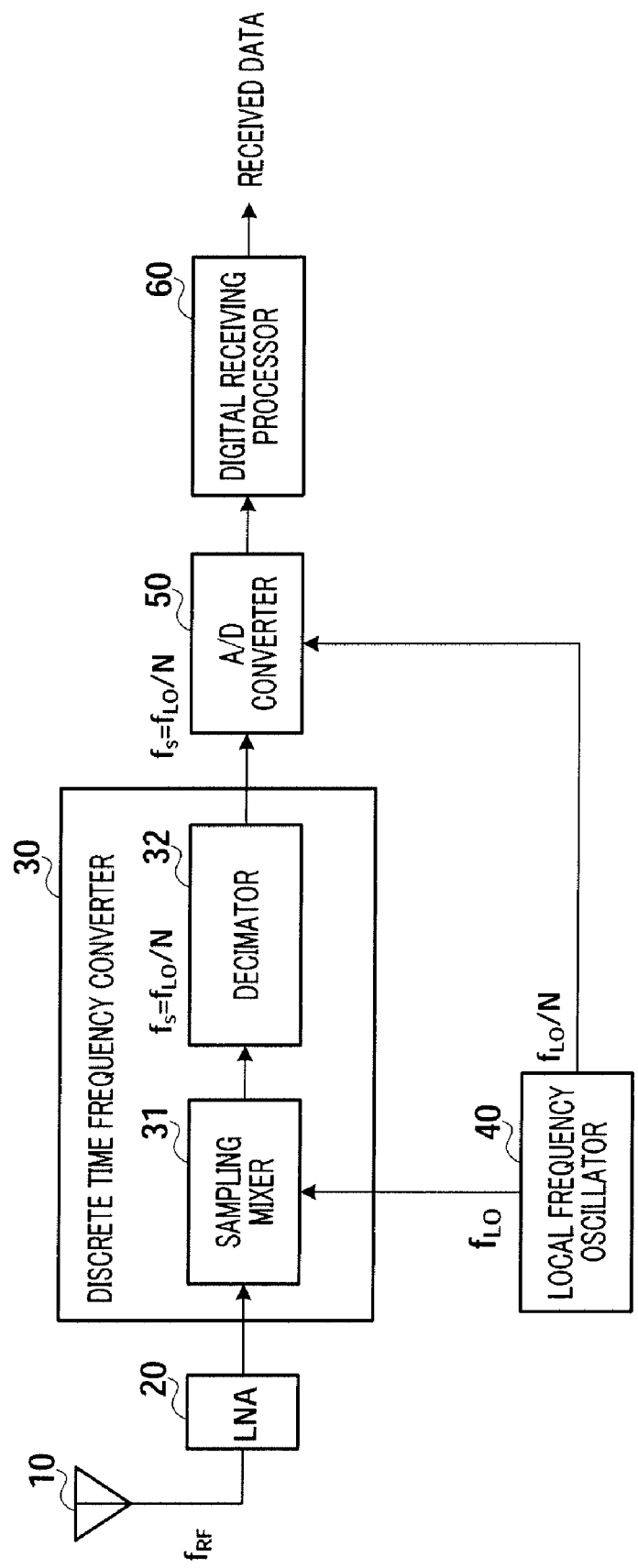
FIG. 1 is a block diagram showing the configuration of a radio receiver according to the related art.

Embodiments of the present invention will be described below in detail with reference to the accompanying drawings. In the following embodiments, the same components are assigned the same reference numerals and overlapping descriptions thereof will not be repeated.

Embodiment 1

In this embodiment, in a receiving system that performs a discrete time process, the configuration and operation of a DIGITAL RECEIVING PROCESSOR correcting filtered frequency response characteristic, in accordance with the sampling rate, which varies depending on the received channel frequency, using information related to local frequency.

Figure 2:
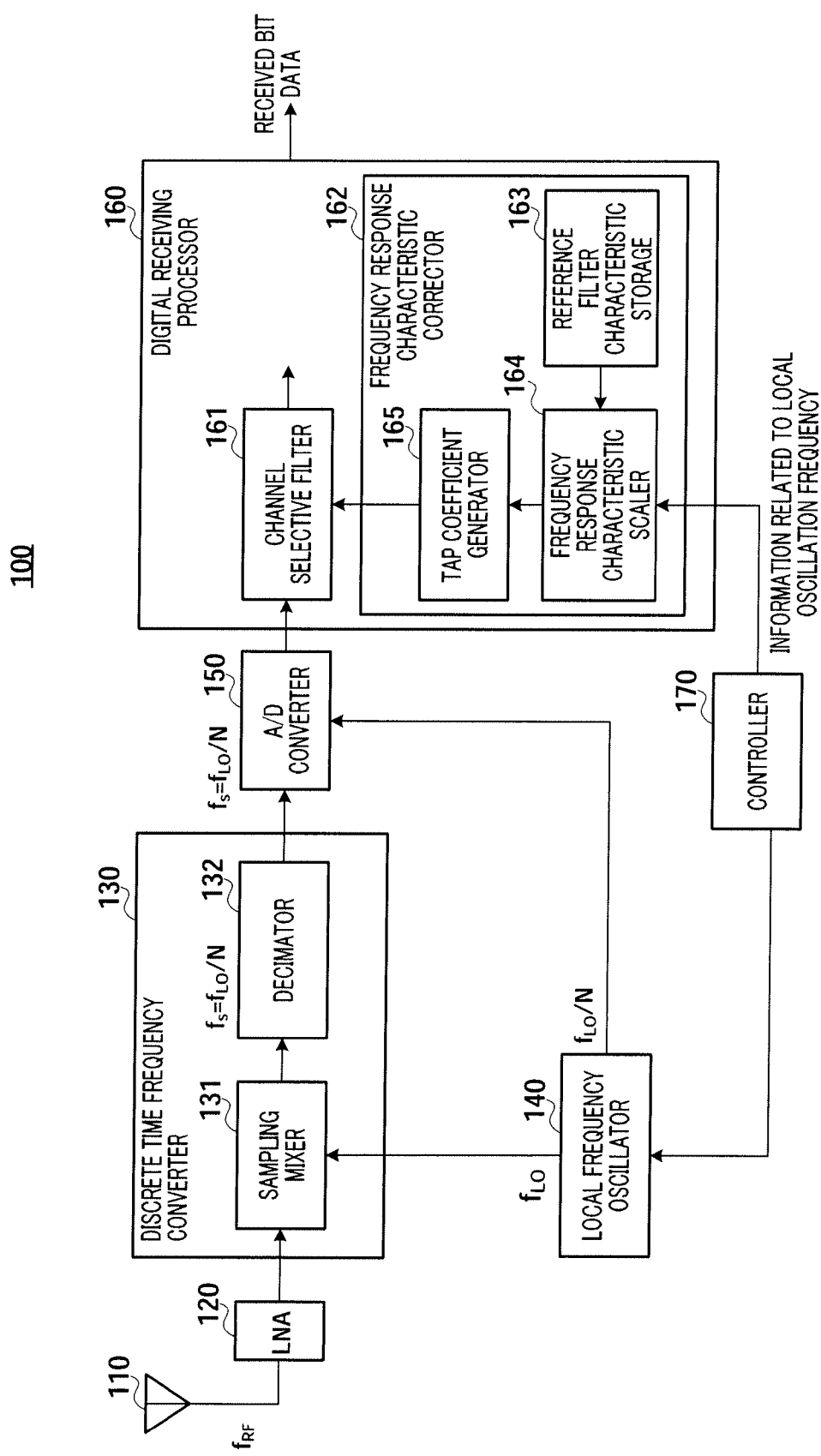
FIG. 2 is a block diagram showing the configuration of a radio receiver according to Embodiment 1 of the present invention.

FIG. 2 is a block diagram showing the configuration of radio receiver 100 according to this embodiment. Radio receiver 100 receives digital modulated signals transmitted at a carrier frequency $f_{RF}$, performs a predetermined demodulating process on the received signals, and output the resulting received bit data. Radio receiver 100 includes antenna 110, low noise amplifying section (LNA) 120, DISCRETE TIME FREQUENCY CONVERTER 130, LOCAL FREQUENCY OSCILLATOR 140, A/D CONVERTER 150, DIGITAL RECEIVING PROCESSOR 160, and CONTROLLER 170.

Antenna 110 receives signals that are transmitted at the carrier frequency $f_{RF}$ through a radio propagation path, and outputs the signals to low noise amplifying section 120.

Low noise amplifying section 120 amplifies an input high frequency signal, and outputs the amplified signal.

DISCRETE TIME FREQUENCY CONVERTER 130 performs a discrete time frequency converting process on an input digital modulated signal in a carrier frequency into a low frequency signal, and lowers the sampling rate and outputs the result. Then, DISCRETE TIME FREQUENCY CONVERTER 130 outputs the resulting signal. For example, as shown in FIG. 2, DISCRETE TIME FREQUENCY CONVERTER 130 includes sampling mixer 131 and DECIMATOR 132.

Sampling mixer 131 mixes the received signal in the carrier frequency band with a local frequency oscillation signal at discrete times, to perform frequency conversion. Sampling mixer 131 is composed of, for example, a FET switch, and performs frequency conversion by switching the received signal in the carrier frequency band using the local oscillation frequency signal.

DECIMATOR 132 lowers the sampling rate by puncturing the input signal of discrete times, and outputs the result. In this embodiment, as an example, it is assumed that an input sampling rate is converted to $\frac{1}{128}$ of the input sampling rate.

Further, in this embodiment, circuit processing sections for performing a filtering process to remove harmonic components generated during the frequency conversion or aliasing distortion generated during the sampling rate conversion are not illustrated, since these circuit processing sections do not limit the present invention. However, such processing sections may be inserted between the components, or a configuration for performing a filtering process in DECIMATOR 132 is equally possible. DISCRETE TIME FREQUENCY CONVERTER 130 performing frequency conversion may be formed in a so-called Zero-IF output configuration, whereby the carrier frequency $f_{RF}$ and the local oscillation frequency $f_{LO}$ are to be substantially equal for conversion to the baseband, or DISCRETE TIME FREQUENCY CONVERTER 130 may be configured to set the carrier frequency $f_{RF}$ and the local oscillation frequency $f_{LO}$ with a predetermined frequency difference $f_{IF}$ and output the intermediate frequency of the low frequency band (Low-IF). This embodiment will be explained assuming the Zero-IF output configuration.

LOCAL FREQUENCY OSCILLATOR 140 outputs a local oscillation frequency signal with the local oscillation frequency $f_{LO}$ based on an oscillation frequency control signal supplied from CONTROLLER 170. Further, LOCAL FREQUENCY OSCILLATOR 140 outputs a sampling frequency signal of a sampling frequency $f_{LO}/N$ to A/D CONVERTER 150.

A/D CONVERTER 150 quantizes the signal from DISCRETE TIME FREQUENCY CONVERTER 130 into a digital value at a predetermined sampling rate, and outputs a quantized received digital modulated signal. In this embodiment, A/D CONVERTER 150 quantizes the low frequency signal outputted from DISCRETE TIME FREQUENCY CONVERTER 130 using the sampling frequency $f_{LO}/N$ supplied from LOCAL FREQUENCY OSCILLATOR 140.

DIGITAL RECEIVING PROCESSOR 160 performs a predetermined reception process on the received digital modulated signal transmitted from A/D CONVERTER 150 to obtain received bit data, and outputs the received bit data. DIGITAL RECEIVING PROCESSOR 160 includes at least CHANNEL SELECTIVE FILTER 161 and FREQUENCY RESPONSE CHARACTERISTIC CORRECTOR 162. Further, with this embodiment, a predetermined demodulating section and codec processing section in the DIGITAL RECEIVING PROCESSOR has no influence upon the essence of the present invention, and thus the illustrations and descriptions thereof will not be provided. However, when these processing sections are to be described, they may be provided, for example, in subsequent stages of CHANNEL SELECTIVE FILTER 161.

CHANNEL SELECTIVE FILTER 161 performs a product-sum operation of the input received digital modulated signal using tap coefficient data supplied separately. CHANNEL SELECTIVE FILTER 161 perform channel selection by the product-sum operation, that is, performs a digital filtering process of passing only the bandwidth of modulated signals to be received and removing the frequency components outside the bandwidth. Then, CHANNEL SELECTIVE FILTER 161 outputs the obtained result to the processing section provided in the rear stage of DIGITAL RECEIVING PROCESSOR 160. In this embodiment, CHANNEL SELECTIVE FILTER 161 performs a finite impulse response (FIR) filtering process.

FREQUENCY RESPONSE CHARACTERISTIC CORRECTOR 162 determines the value of the tap coefficient used by CHANNEL SELECTIVE FILTER 161 based on "information related to the local oscillation frequency" from CONTROLLER 170, and outputs the value to CHANNEL SELECTIVE FILTER 161.

Specifically, FREQUENCY RESPONSE CHARACTERISTIC CORRECTOR 162 includes REFERENCE FILTER CHARACTERISTIC STORAGE 163, FREQUENCY RESPONSE CHARACTERISTIC SCALER 164, and TAP COEFFICIENT GENERATOR 165.

REFERENCE FILTER CHARACTERISTIC STORAGE 163 stores "reference characteristic data of frequency response characteristic" of the channel selective filtering process performed by CHANNEL SELECTIVE FILTER 161. REFERENCE FILTER CHARACTERISTIC STORAGE 163 is composed of, for example, a non-volatile memory. The "reference characteristic data of frequency response characteristic" will be described in detail later.

FREQUENCY RESPONSE CHARACTERISTIC SCALER 164 performs a correcting process on reference frequency response characteristic matching the characteristic data stored in REFERENCE FILTER CHARACTERISTIC STORAGE 163, based on the "information related to the local oscillation frequency", and outputs the corrected frequency response characteristic data. This correcting process will be described in detail later.

TAP COEFFICIENT GENERATOR 165 converts the frequency response characteristic data received from FREQUENCY RESPONSE CHARACTERISTIC SCALER 164 into impulse response characteristic data, and generates a tap coefficient value for the filtering process in CHANNEL SELECTIVE FILTER 161. TAP COEFFICIENT GENERATOR 165 is composed of, for example, an arithmetic section that performs the inverse Fourier transform.

CONTROLLER 170 outputs an oscillation frequency control signal to LOCAL FREQUENCY OSCILLATOR 140 to generate a local oscillation frequency signal matching the received channel frequency. Further, CONTROLLER 170 provides the "information related to the local oscillation frequency" to DIGITAL RECEIVING PROCESSOR 160. In this embodiment, as an example, it is assumed that a system is allocated with the received channel frequency band of 600 MHz or more and 800 MHz or less, and, for ease of explanation, it is also assumed that a maximum channel frequency $f_{ch\_max}$ is 800 MHz, a minimum channel frequency $f_{ch\_min}$ is 600 MHz, and the bandwidth of the modulated signal is ±800 kHz.

In radio receiver 100 having the above-mentioned configuration in which the setting of the local oscillation frequency is changed by the received channel frequency, which causes the sampling rate $f_s$ of A/D CONVERTER 150 to vary, the control operation of DIGITAL RECEIVING PROCESSOR 160 adaptively correcting a filter frequency response matching the sampling rate will be described below.

REFERENCE FILTER CHARACTERISTIC STORAGE 163 of FREQUENCY RESPONSE CHARACTERISTIC CORRECTOR 162 stores frequency response characteristic $H_1(f)$ in the filtering process of passing a ±800 kHz bandwidth, which is substantially equal to the channel frequency bandwidth, when, among the channel frequencies allocated to the system, the signal of the maximum channel frequency $f_{ch\_max}$ (800 MHz) is received, subjected to a frequency conversion to the Zero-IF band in DISCRETE TIME FREQUENCY CONVERTER 130, decimated to 1/128, and subjected to A/D conversion at a sampling rate of 6.25 MHz. In this embodiment, assuming 7th order Butterworth frequency response characteristic as an example of $H_1(f)$, $H_1(f)$ can be represented by equation 1 given below:

(Equation 1)

$$|H_1(f)| = \frac{1}{\sqrt{1 + \left\{\frac{f}{f_0}\right\}^{2\times 7}}} \quad [1]$$

Here, $f_0$ indicates the 3 dB cutoff frequency, and corresponds to 800 kHz in this embodiment. In equation 1, when frequencies obtained by normalizing $f$ and $f_0$ with the sampling frequency $f_s$ are represented by $f'$ and $f_0'$, respectively, $f'$ and $f_0'$ can be represented by equation 2 and equation 3 given below:

[2]

$$f'=f/f_s (-f_s/2 \leq f < f_s/2) \quad \text{(Equation 2)}$$

$$f_0'=f_0/f_s=800\text{ k}/800\text{ M}=1/1000 \quad \text{(Equation 3)}$$

Then, equation 1 can be represented by equation 4 using the frequency $f'$ normalized with the sampling frequency $f_S$.

(Equation 4)

$$|H_1(f')| = \frac{1}{\sqrt{1 + \{1000 \times f'\}^{2\times 7}}} \quad (-0.5 \leq f' < 0.5) \quad [3]$$

Figure 3:
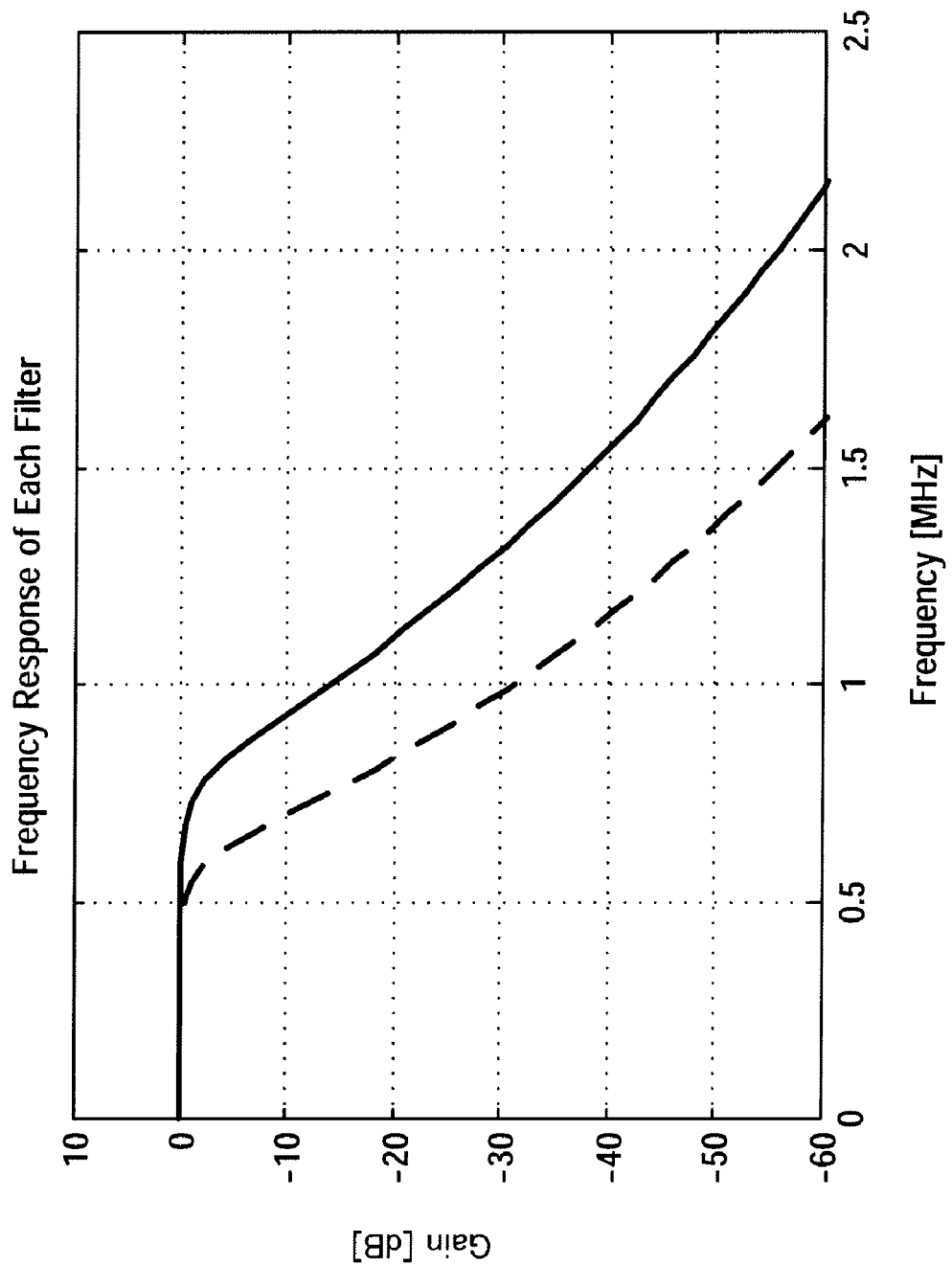
FIG. 3 is a diagram illustrating a variation in frequency response characteristic according to the received channel frequency.

FIG. 3 is an enlarged view illustrating the vicinity of the pass band among the frequency response characteristic represented by equation 1. In FIG. 3, the solid line indicates the frequency response characteristic of the received signal with the maximum channel frequency. In this embodiment, the frequency response characteristic represented by equation 1 is obtained assuming that the sampling frequency is the maximum channel frequency of 800 MHz. Therefore, if equation 1 is applied as is to the received channel frequency of 600 MHz, the sampling rate $f_S$ is 600/128=4.6875 MHz. For this reason, if the frequency response characteristic represented by equation 1 is applied as is to the filtering process, frequency response characteristic represented by the dotted line in FIG. 3 are obtained and the modulated signal band is partly removed.

FREQUENCY RESPONSE CHARACTERISTIC SCALER 164 corrects reference frequency response characteristic matching the characteristic data, which are stored in REFERENCE FILTER CHARACTERISTIC STORAGE 163, based on the "information related to the local oscillation frequency".

Specifically, FREQUENCY RESPONSE CHARACTERISTIC SCALER 164 corrects frequency response characteristic matching equation 4, which are stored in REFERENCE FILTER CHARACTERISTIC STORAGE 163, using information related to a local oscillation frequency $f_n$ supplied from CONTROLLER 170. That is, the FREQUENCY RESPONSE CHARACTERISTIC SCALER calculates corrected frequency characteristics $C_1(f)$ represented by equation 5 given below:

(Equation 5)

$$C_1(f') = H_1\left(f' \frac{f_{s\,max}}{f_s}\right) \quad [4]$$

$$= \frac{1}{\sqrt{1+\left\{\frac{1000 \times f' \times f_{s\,max}}{f_s}\right\}^{2\times 7}}} \quad (-0.5 \le f' < 0.5)$$

Here, $f_S$ indicates the sampling rate of a signal outputted from DECIMATOR 132 when the received channel frequency is $f_n$, and $f_{Smax}$ indicates the sampling rate of the signal outputted from DECIMATOR 132 when the received channel frequency is 800 MHz, which is the maximum channel frequency. Further, when DISCRETE TIME FREQUENCY CONVERTER 130 performs frequency conversion in the Zero-IF mode, $f_S$ and $f_{Smax}$ in equation 5 are represented by equation 6 and equation 7, respectively, considering that the received channel frequency is $f_n$ and the decimation rate in DECIMATOR 132 is 1/128.

[5]

$$f_s = f_n/128 \quad \text{(Equation 6)}$$

$$f_{s\,max\,0} = f_{ch\,max}/128 = 800\,\text{MHz}/128 = 6.25\,\text{MHz} \quad \text{(Equation 7)}$$

TAP COEFFICIENT GENERATOR 165 performs an inverse Fourier transform to convert the frequency response characteristic $C_1(f)$, which have been corrected using equation 5 by FREQUENCY RESPONSE CHARACTERISTIC SCALER 164, into impulse response characteristic. TAP COEFFICIENT GENERATOR 165 supplies the obtained impulse response characteristic as a tap coefficient to be used in the FIR filtering process performed in CHANNEL SELECTIVE FILTER 161.

In this way, FREQUENCY RESPONSE CHARACTERISTIC CORRECTOR 162 corrects the frequency response characteristic using the "information related to the local oscillation frequency", and performs a digital filtering process using the obtained tap coefficient, thereby performing a channel selective filtering process using substantially constant frequency response characteristic (the solid line in FIG. 3) without depending on the sampling frequency that varies between received channels (in this embodiment, 600 MHz and 800 MHz).

As described above, according to the configuration and operation of the present invention, in radio receiver 100 including DISCRETE TIME FREQUENCY CONVERTER 130 that converts the sampling rate according to the received channel frequency, information related to the local oscillation frequency is used to scale the reference frequency response characteristic in the frequency domain to generate a tap coefficient for the filtering process, and the filtering process is performed using the tap coefficient. In this way, it is possible to perform the filtering process with substantially constant frequency response characteristic, regardless of the conversion of a sampling rate in accordance with the received channel frequency, and thus reduce the influence of unnecessary removal of modulated signal bandwidth components. As a result, it is possible to improve reception characteristics and thus provide a radio receiver that are applicable to systems having a wide channel frequency bandwidth.

Furthermore, radio receiver 100 according to this embodiment has such configuration that information related to the frequency of the local oscillation signal generated by local frequency oscillator 140 is supplied from CONTROLLER 170 to DIGITAL RECEIVING PROCESSOR 160. However, the present invention is not limited to this. For example, a configuration in which the information is supplied from local frequency oscillator 140 to DIGITAL RECEIVING PROCESSOR 160 may be employed.

Moreover, in this embodiment, the frequency response characteristic is subjected to scaling correction using information related to the local oscillation frequency, but the present invention is not limited to this. Essentially, it is preferable to estimate the sampling rate of an output terminal of the DISCRETE TIME FREQUENCY CONVERTER that varies according to the received channel frequency. Specifically, DIGITAL RECEIVING PROCESSOR 160 may correct the scale of the frequency response characteristic according to the sampling rate of the output terminal of the DISCRETE TIME FREQUENCY CONVERTER. Therefore, in the configuration of the existing radio receivers where the relationship between the received channel frequency and the local oscillation frequency is known from the design, for example, information related to the channel number or the central frequency value of the received channel frequency may be used, instead of information related to the local oscillation frequency.

Further, in this embodiment, REFERENCE FILTER CHARACTERISTIC STORAGE 163 stores the frequency response characteristic of the filter required in radio receiver 100 to receive signals with the maximum channel frequency as reference data, and calculates frequency response characteristic required to receive signals with a channel frequency lower than the maximum channel frequency using frequency scaling correcting. However, the present invention is not limited to this. For example, by contrast, REFERENCE FILTER CHARACTERISTIC STORAGE 163 may store the frequency response characteristic the radio receiver requires to receive signals with the minimum channel frequency as the reference data, and calculate frequency response characteristic required to receive signals with a channel frequency higher than the minimum channel frequency, using frequency scaling correction. Alternatively, the REFERENCE FILTER CHARACTERISTIC STORAGE may store frequency response characteristic required to receive signals with a channel frequency corresponding to the center of the channel frequency band as the reference data, and perform scaling correction according to the received channel frequency. Specifically, REFERENCE FILTER CHARACTERISTIC STORAGE 163 may store frequency response characteristic matching the reference frequency (for example, the maximum channel frequency) as reference data, and perform scaling correction according to the received channel frequency.

As described above, according to Embodiment 1, radio receiver 100 includes: DISCRETE TIME FREQUENCY CONVERTER 130 that outputs a discrete time analog signal with a sampling rate matching a local frequency by sampling a received signal at discrete times using the local frequency signal, thereby performing frequency conversion and decimation; A/D CONVERTER 150 that quantizes the discrete time analog signal into a digital value and outputs a received digital signal; CHANNEL SELECTIVE FILTER 161 that performs a digital filtering process on the received digital signal using the tap coefficient value; and FREQUENCY RESPONSE CHARACTERISTIC CORRECTOR 162 that generates the tap coefficient matching the sampling rate.

In this way, the digital filtering process is performed using a tap coefficient matching the sampling rate. Therefore, even when the sampling rate varies according to the received channel frequency of a received signal, it is possible to perform a filtering process with substantially constant frequency response characteristic, and thus reduce the influence of unnecessary removal of modulated signal bandwidth components. As a result, it is possible to improve reception characteristics, and thus provide a radio receiver that are applicable to systems having a wide channel frequency bandwidth.

FREQUENCY RESPONSE CHARACTERISTIC CORRECTOR 162 includes: REFERENCE FILTER CHARACTERISTIC STORAGE 163 that stores frequency response characteristic matching the reference frequency; FREQUENCY RESPONSE CHARACTERISTIC SCALER 164 that corrects the scale of the frequency response characteristic matching the reference frequency, which are stored in REFERENCE FILTER CHARACTERISTIC STORAGE 163, in the frequency domain, based on information related to the local frequency matching the sampling rate; and TAP COEFFICIENT GENERATOR 165 that converts the corrected frequency response characteristic into an impulse response to generate a tap coefficient value for a digital filter.

Embodiment 2

This embodiment describes the configuration and operation of a DIGITAL RECEIVING PROCESSOR that has the filtering effect during frequency conversion using a discrete time process and performs a correction filtering process corresponding to a variation in frequency response characteristic, which is caused depending on a received channel frequency by the filtering effect, using information related to a local oscillation frequency.

Figure 4:
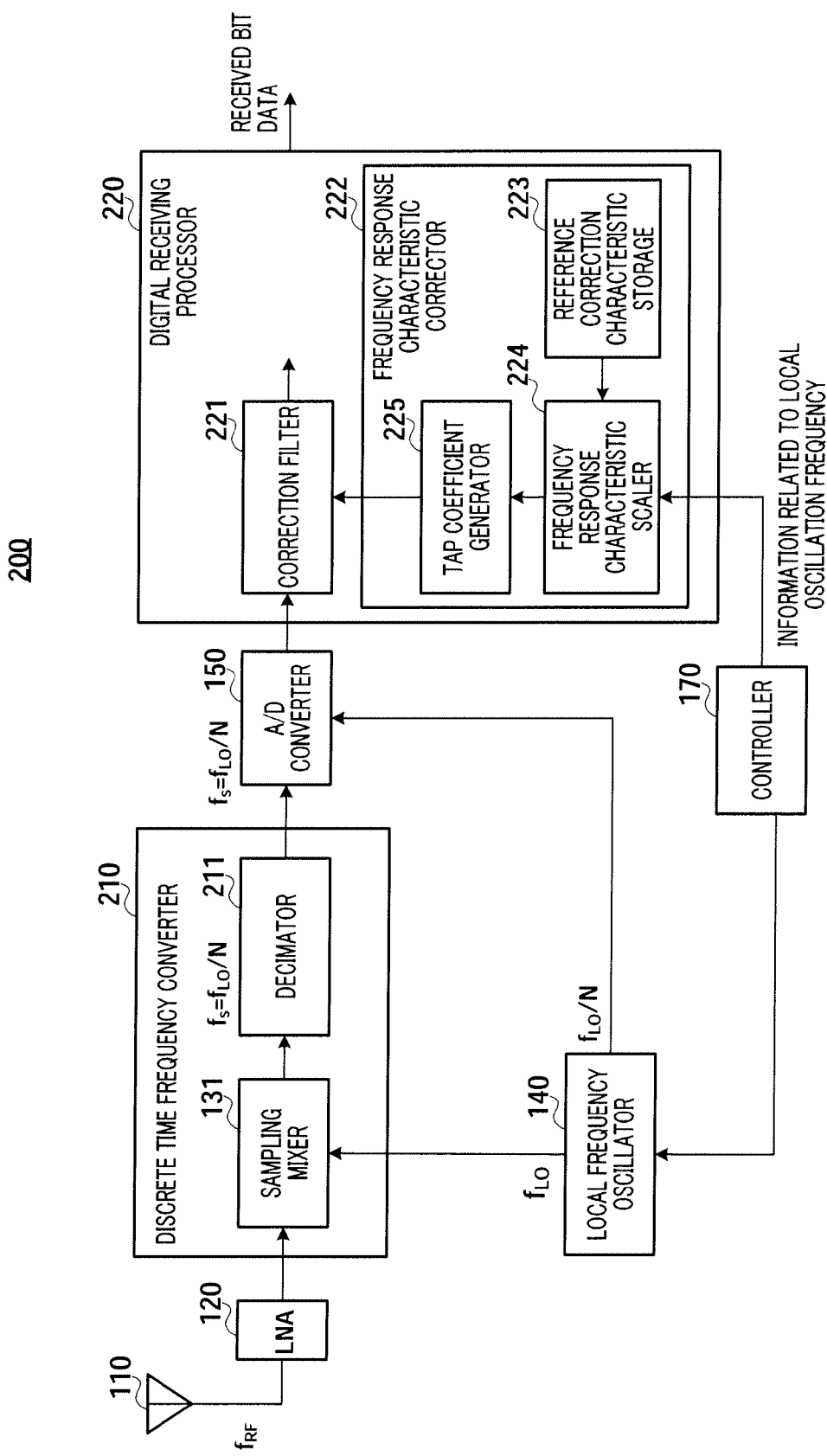
FIG. 4 is a block diagram showing the configuration of a radio receiver according to Embodiment 2 of the present invention.

FIG. 4 is a diagram showing the configuration of radio receiver 200 according to this embodiment. In radio receiver 200, components having the same operation and configuration as those in radio receiver 100 shown in FIG. 2 are assigned the same reference numerals, and a description thereof will not be repeated, for ease of explanation. Radio receiver 200 differs from radio receiver 100 in the configuration and operation of DECIMATOR 211 in DISCRETE TIME FREQUENCY CONVERTER 210 and CORRECTION FILTER 221 and FREQUENCY RESPONSE CHARACTERISTIC CORRECTOR 222 in DIGITAL RECEIVING PROCESSOR 220.

Further, this embodiment, similar to Embodiment 1, assumes a system where the received channel frequency band is allocated between 600 MHz and 800 MHz, and, for ease of explanation, assumes that the maximum channel frequency is 800 MHz, the minimum channel frequency is 600 MHz and the bandwidth of a modulated signal is +500 kHz.

Similar to DECIMATOR 132 shown in FIG. 2, DECIMATOR 211 decimates discrete time input signals to convert a sampling rate into a lower value and outputs the resulting signals. Further, DECIMATOR 211 provides a filtering effect of removing high frequency components during the decimation process.

As the configuration having this filtering effect, for example, the configuration and method disclosed in Non-Patent Document 1 have been proposed. However, a detailed description thereof will not be repeated since no effect is made on the essence of the present invention.

Figure 5:
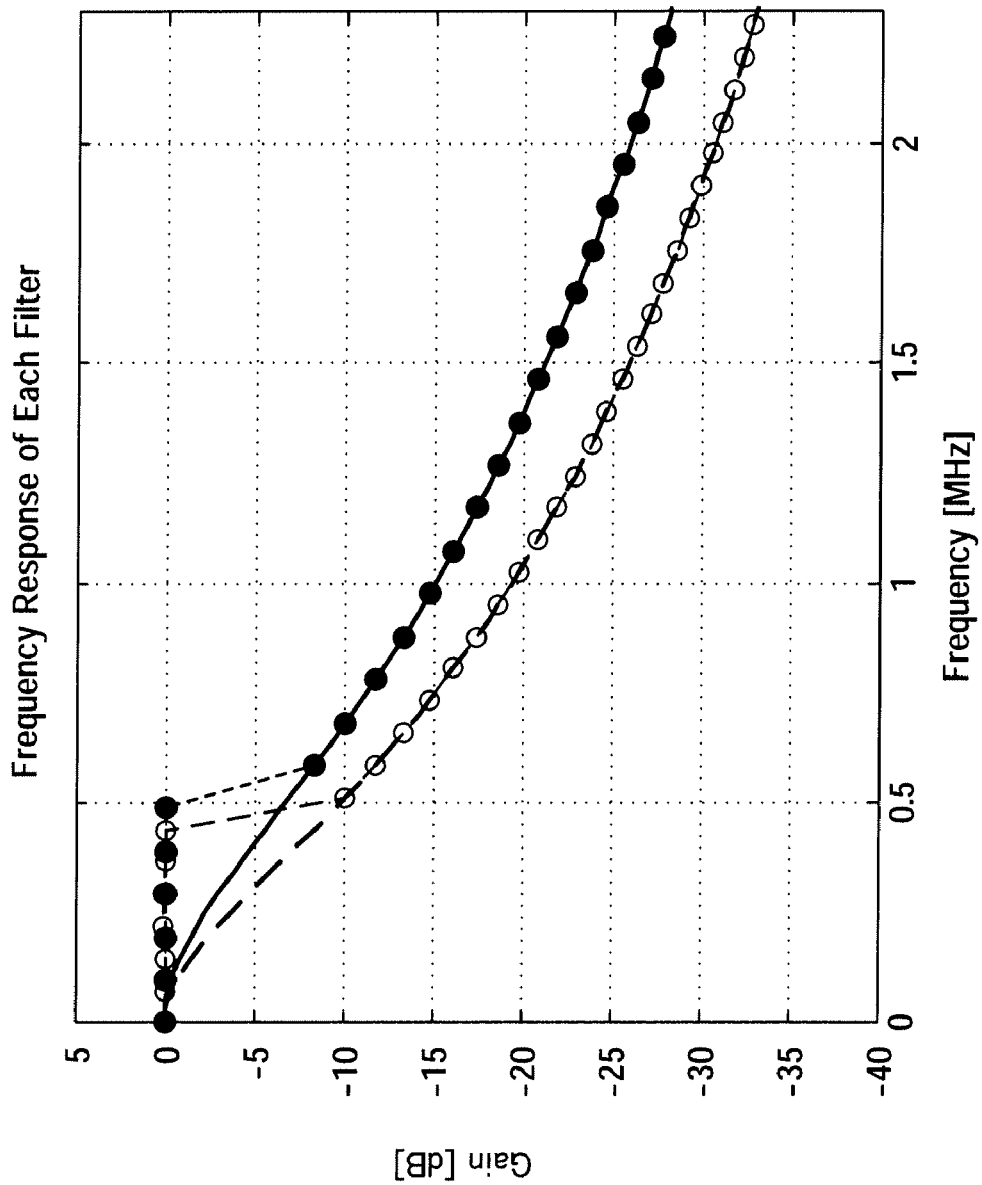
FIG. 5 is a diagram illustrating frequency response characteristic of a DISCRETE TIME FREQUENCY CONVERTER and a frequency response characteristic correction process performed by a CORRECTION FILTER shown in FIG. 4.

In this embodiment, it is assumed that, as an example of the filtering effect, frequency response characteristic shown in FIG. 5 are obtained. In FIG. 5, the solid line indicates characteristics obtained when the received channel frequency is 800 MHz, which is the maximum channel frequency, and the dotted line indicates characteristics obtained when the received channel frequency is 600 MHz, which is the minimum channel frequency. As such, when frequency conversion by discrete time signal processing and sampling rate conversion by decimation are performed, filtered frequency response characteristic and the sampling rate obtained at the final stage vary according to the received channel frequency.

CORRECTION FILTER 221 performs a digital filtering process on the received digital modulated signal supplied from A/D CONVERTER 150, using the tap coefficient value supplied from FREQUENCY RESPONSE CHARACTERISTIC CORRECTOR 222, to correct frequency response characteristic of filtering by DISCRETE TIME FREQUENCY CONVERTER 210. The correction of the frequency response characteristic will be described in detail later.

FREQUENCY RESPONSE CHARACTERISTIC CORRECTOR 222 determines the value of a tap coefficient that is used in CORRECTION FILTER 221, based on the information related to the local frequency supplied from CONTROLLER 170, and outputs the value to CORRECTION FILTER 221.

Specifically, FREQUENCY RESPONSE CHARACTERISTIC CORRECTOR 222 includes REFERENCE CORRECTION CHARACTERISTIC STORAGE 223, FREQUENCY RESPONSE CHARACTERISTIC SCALER 224, and TAP COEFFICIENT GENERATOR 225.

REFERENCE CORRECTION CHARACTERISTIC STORAGE 223 stores correction characteristic data, which is a standard for frequency response characteristic of the channel selective filtering process performed by CORRECTION FILTER 221. REFERENCE CORRECTION CHARACTERISTIC STORAGE 223 is formed of, for example, a non-volatile memory. The correction characteristic data will be described in detail later.

FREQUENCY RESPONSE CHARACTERISTIC SCALER 224 performs a scaling correcting process on the correction characteristic data stored in REFERENCE CORRECTION CHARACTERISTIC STORAGE 223, based on the information related to the local oscillation frequency, and outputs the corrected frequency response characteristic data. This scaling correcting process will be described in detail later.

TAP COEFFICIENT GENERATOR 225 converts the corrected frequency characteristic data received from FREQUENCY RESPONSE CHARACTERISTIC SCALER 224 into impulse response characteristic, and generates a tap coefficient value for filtering. TAP COEFFICIENT GENERATOR 225 is composed of, for example, an arithmetic section that performs the inverse Fourier transform.

The operation of DIGITAL RECEIVING PROCESSOR 220 provided in the subsequent stage of radio receiver 200 to correct frequency response characteristic according to the sampling rate will be described below.

REFERENCE CORRECTION CHARACTERISTIC STORAGE 223 of FREQUENCY RESPONSE CHARACTERISTIC CORRECTOR 222 stores frequency response characteristic $C_2(f)$ for correcting the gain of a channel frequency band which is attenuated by the filtering effect of the DECIMATOR 211, that is, a frequency band lower than 500 kHz, when a signal with the maximum channel frequency $f_{ch\_max}$ (800 MHz) among the channel frequencies allocated to the system is received and DISCRETE TIME FREQUENCY CONVERTER 210 converts the frequency of the signal into a Zero-IF band, decimates the frequency at a rate of 1/128, and performs A/D conversion on the decimated signal at a sampling rate of 6.25 MHz. When the frequency response characteristic of the filtering effect obtained by DECIMATOR 211 are represented by $H_2(f)$, $C_2(f)$ can be represented by equation 8 given below.

(Equation 8)

$$C_2(f) = \begin{cases} \dfrac{1}{H_2(f)} & (-f_c \le f < +f_c) \\ 1 & \left(-\dfrac{f_s}{2} \le f < -f_c, +f_c \le f < +\dfrac{f_s}{2}\right) \end{cases} \quad [6]$$

Here,
$f_C$ indicates the pass band of modulated signals, and corresponds to 500 kHz in this embodiment.

When a frequency f'' that is normalized with the sampling frequency $f_S$ is substituted into equation 8, the following equation 9 is obtained:

(Equation 9)

$$C_2(f') = \begin{cases} \dfrac{1}{H_2(f')} & \left(-\dfrac{1}{1600} \le f' < +\dfrac{1}{1600}\right) \\ 1 & \left(-0.5 \le f' < -\dfrac{1}{1600}, +\dfrac{1}{1600} \le f' < +0.5\right) \end{cases} \quad [7]$$

REFERENCE CORRECTION CHARACTERISTIC STORAGE 223 stores, as reference data, correction characteristics of the signal received at the maximum channel frequency as represented by equation 8.

FIG. 5 is an enlarged view illustrating characteristics of the vicinity of a modulated signal band among the frequency response characteristic of the filtering effect of DECIMATOR 211 and the frequency characteristic correction effect of DIGITAL RECEIVING PROCESSOR 220 in radio receiver 200. In FIG. 5, the solid line indicates the frequency response characteristic of the filtering effect of DECIMATOR 211 when signals are received at a maximum received channel frequency of 800 MHz, and the dotted line indicates the frequency response characteristic of the filtering effect of DECIMATOR 211 when signals are received at a minimum received channel frequency of 600 MHz.

Further, the black circle symbols plotted in FIG. 5 indicate corrected frequency characteristics obtained by converting the frequency of the signal received at the maximum channel frequency, subjecting the converted signal to decimation, and performing frequency correction represented by equation 9 on the decimated signal. As shown in FIG. 5, the decimated signal is corrected so that the gain characteristic is flat up to 500 kHz matching the modulation bandwidth, that is, a substantially constant gain is obtained up to 500 kHz matching the modulation bandwidth.

In contrast, when frequency conversion and decimation are sequentially performed on the signal received at a minimum channel frequency of 600 MHz and frequency correction represented by equation 9 is then performed on the processed signal without any change, matching between the frequency response characteristic of DECIMATOR 211 and the correction characteristics of DIGITAL RECEIVING PROCESSOR 220 is not obtained due to the difference between the sampling rates, which makes it difficult to obtain correction characteristics of a constant gain in the modulation bandwidth. For this reason, FREQUENCY RESPONSE CHARACTERISTIC SCALER 224 performs a scaling correction process on the frequency characteristics represented by equation 9.

FREQUENCY RESPONSE CHARACTERISTIC SCALER 224 performs a scaling correction process on the frequency response characteristic matching equation 9, which are stored in REFERENCE CORRECTION CHARACTERISTIC STORAGE 223, using the information related to the local oscillation frequency supplied from CONTROLLER 170. That is, FREQUENCY RESPONSE CHARACTERISTIC SCALER 224 calculates corrected frequency characteristics $C'_2(f')$ represented by equation 10 given below:

(Equation 10)

$$C'_2(f') = \begin{cases} \dfrac{1}{H_2\left(f' \times \dfrac{f_{s\,max}}{f_s}\right)} & \left(-\dfrac{1}{1600} \times \dfrac{f_{s\,max}}{f_s} \le f < +\dfrac{1}{1600} \times \dfrac{f_{s\,max}}{f_s}\right) \\ 1 & \left(-0.5 \le f' < -\dfrac{1}{1600} \times \dfrac{f_{s\,max}}{f_s}, +\dfrac{1}{1600} \times \dfrac{f_{s\,max}}{f_s} \le f' < +0.5\right) \end{cases} \quad [8]$$

TAP COEFFICIENT GENERATOR 225 performs the inverse Fourier transform to convert the frequency response characteristic corrected by FREQUENCY RESPONSE CHARACTERISTIC SCALER 224 using equation 10 into impulse response characteristic, and supplies the obtained impulse response characteristic as a tap coefficient that is used for an FIR filtering process in CORRECTION FILTER 221.

In this way, FREQUENCY RESPONSE CHARACTERISTIC CORRECTOR 222 corrects the frequency response characteristic using information related to the local process using the obtained tap coefficient. Therefore, the frequency characteristics are corrected as represented by the white (hollow) circle symbol in FIG. 5, without depending on the sampling frequency (in this embodiment, 600 MHz and 800 MHz) that varies between received channels. That is, the frequency characteristics are corrected so that gain characteristics are flat up to 500 kHz matching the modulation bandwidth, that is, a substantially constant gain is obtained up to 500 kHz matching the modulation bandwidth, without depending on the sampling frequency (in this embodiment, 600 MHz and 800 MHz) that varies between received channels.

As described above, according to the configuration and operation of the present invention, in radio receiver 200 including DISCRETE TIME FREQUENCY CONVERTER 210 that converts the sampling rate according to the received channel frequency, information related to the local oscillation frequency is used to scale the reference frequency response characteristic in the frequency domain to generate a tap coefficient for the filtering process, and the filtering process is performed using the tap coefficient. In this way, it is possible to perform the filtering process with frequency response characteristic in which a substantially constant gain is obtained up to the modulation bandwidth, regardless of the conversion of a sampling rate according to the received channel frequency. Thus, the influence of unnecessary removal of modulated signal bandwidth components can be reduced. As a result, it is possible to improve reception characteristics, and thus provide a radio receiver that is applicable to systems having a wide channel frequency bandwidth.

Further, in this embodiment, the configuration and operation of CORRECTION FILTER 221 performing scale correction on the frequency response characteristic that vary according to the received channel frequency have been described. However, the present invention is not limited to this, the present invention can be applied to the configuration in which DIGITAL RECEIVING PROCESSOR 220 converts the sampling rate. For example, when DIGITAL RECEIVING PROCESSOR 220 converts the signal that is input at a sampling rate of $f_S=N\times\Delta f$ into a sampling rate of $f_{S'}=N\times M/L\times\Delta f$, in order to remove the influence of aliasing, a filtering process is performed so that frequency response characteristic for removing aliasing in a frequency space of $f_{S''}=N\times M\times\Delta f$ are obtained. In addition, DIGITAL RECEIVING PROCESSOR 220 performs the correction process represented by equation 10 on the frequency response characteristic in the vicinity of the pass band of modulated signals, which makes it possible to perform sampling rate conversion and the correction of the gain characteristics in the modulation band without depending on the received channel frequency. The present invention is not limited to the detailed configuration of a sampling rate converting filter.

Furthermore, the object of CORRECTION FILTER 221 is not necessarily limited to correct the gain in the modulated signal band or to convert the sampling rate. For example, the CORRECTION FILTER may perform a correction process to further attenuate signals out of the modulated signal band.

Similar to Embodiment 1, the source of information related to the frequency of the local oscillation signal is not limited to CONTROLLER 170. In addition, DIGITAL RECEIVING PROCESSOR 220 may correct the frequency response characteristic according to the sampling rate of an output terminal of the DISCRETE TIME FREQUENCY CONVERTER. Further, the frequency of correction characteristic data, which is stored in REFERENCE CORRECTION CHARACTERISTIC STORAGE 223 and which is the reference for the frequency response characteristic of the channel selective filtering process performed by CORRECTION FILTER 221, is not necessarily the maximum channel frequency. For example, REFERENCE CORRECTION CHARACTERISTIC STORAGE 223 may store, as reference data, corrected characteristic data corresponding to the reference frequency (for example, the maximum channel frequency), and a scaling correction process may be performed according to the received channel frequency.

As described above, according to Embodiment 2, radio receiver 200 includes: DISCRETE TIME FREQUENCY CONVERTER 210 that samples a received signal at discrete times using a local frequency signal, thereby performing frequency conversion and decimation on the received signal, and outputs a discrete time analog signal with a sampling rate in accordance with the local frequency; A/D CONVERTER 150 that quantizes the discrete time analog signal into a digital value and outputs a received digital signal; CORRECTION FILTER 221 that performs a digital filtering process on the received digital signal using a tap coefficient value; and FREQUENCY RESPONSE CHARACTERISTIC CORRECTOR 222 that generates the tap coefficient matching the sampling rate.

FREQUENCY RESPONSE CHARACTERISTIC CORRECTOR 222 includes: REFERENCE CORRECTION CHARACTERISTIC STORAGE 223 that stores frequency response characteristic matching a reference frequency; FREQUENCY RESPONSE CHARACTERISTIC SCALER 224 that corrects the scale of the frequency response characteristic matching the reference frequency, which are stored in REFERENCE CORRECTION CHARACTERISTIC STORAGE 223, in the frequency domain, based on information related to the local frequency matching the sampling rate; and TAP COEFFICIENT GENERATOR 225 that converts the corrected frequency response characteristic into an impulse response to generate a tap coefficient value for a digital filter. DISCRETE TIME FREQUENCY CONVERTER 210 has a filtering function during decimation, and REFERENCE CORRECTION CHARACTERISTIC STORAGE 223 stores frequency response correction characteristics that allow the gain of the received digital signal, which is obtained using the local frequency corresponding to the reference frequency in the modulation bandwidth, to be substantially constant. FREQUENCY RESPONSE CHARACTERISTIC SCALER 224 corrects the frequency response correction characteristic so that the gain of the received digital signal, which is obtained using the local frequency corresponding to the reference frequency in the modulation bandwidth, is substantially constant, when the local frequency is not equal to the reference frequency. CORRECTION FILTER 221 performs a correction filtering process using the tap coefficient value corresponding to the corrected frequency response correction characteristic.

In this way, in the configuration in which DISCRETE TIME FREQUENCY CONVERTER 210 has the filtering effect during frequency conversion, even when the frequency response characteristic of DISCRETE TIME FREQUENCY CONVERTER 210 vary due to the filtering effect according to the received channel frequency of a received signal, the frequency response correction characteristic are corrected so that the gain of a received digital signal, which is obtained using the local frequency in the modulation bandwidth, is substantially constant, and a correction filtering process is performed using a tap coefficient corresponding to the corrected frequency response correction characteristic. Therefore, it is possible to perform a filtering process with frequency response characteristic that allow a substantially constant gain to be obtained up to a modulation bandwidth, regardless of the conversion of the sampling rate according to the received channel frequency, and thus the influence of unnecessary removal of modulated signal bandwidth components can be reduced. As a result, it is possible to improve reception characteristics, and thus provide a radio receiver that are applicable to systems having a wide channel frequency bandwidth.

Embodiment 3

In this embodiment, configuration and operation for further extending the received channel frequency band in the configuration of the radio receiver according to Embodiment 2 will be described below.

Figure 6:
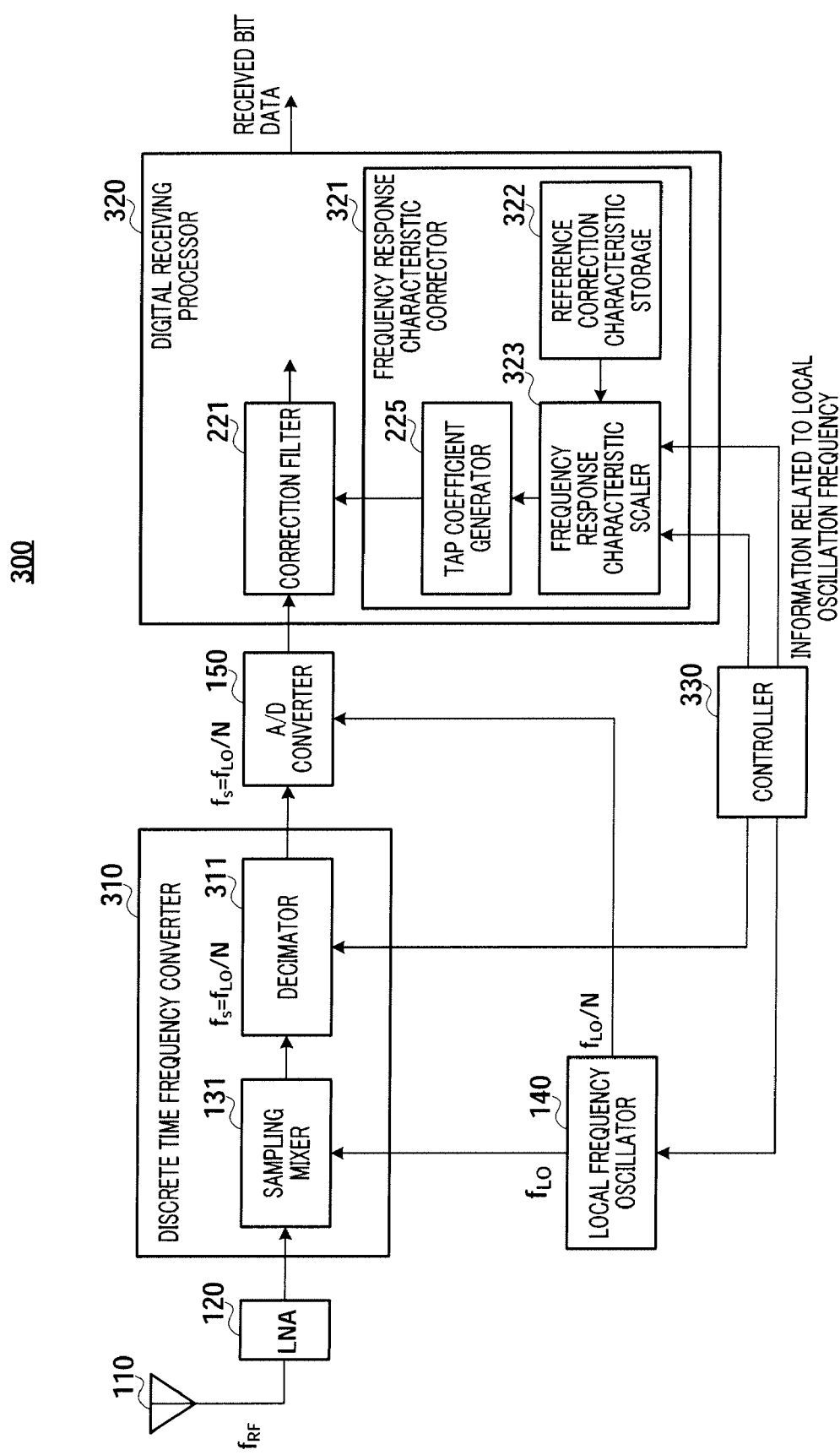
FIG. 6 is a block diagram showing the configuration of a radio receiver according to Embodiment 3 of the present invention.

FIG. 6 is a diagram showing the configuration of radio receiver 300 according to this embodiment. In radio receiver 300, components having the same configuration and operation as those in radio receiver 200 shown in FIG. 4 are assigned the same reference numerals, and a detailed description thereof will not be repeated. Radio receiver 300 differs from radio receiver 200 in the configuration and operation of DECIMATOR 311 in DISCRETE TIME FREQUENCY CONVERTER 310 and FREQUENCY RESPONSE CHARACTERISTIC CORRECTOR 321 in DIGITAL RECEIVING PROCESSOR 320 and CONTROLLER 330.

Further, in this embodiment, it is assumed that a system is allocated with the received channel frequency band of 400 MHz to 800 MHz, and the system corresponds to a channel frequency band lower than that in Embodiment 2 by 200 MHz. In addition, for ease of explanation, it is assumed that the maximum channel frequency is 800 MHz, the minimum channel frequency is 400 MHz and the bandwidth of modulated signals is ±500 kHz.

Figure 7:
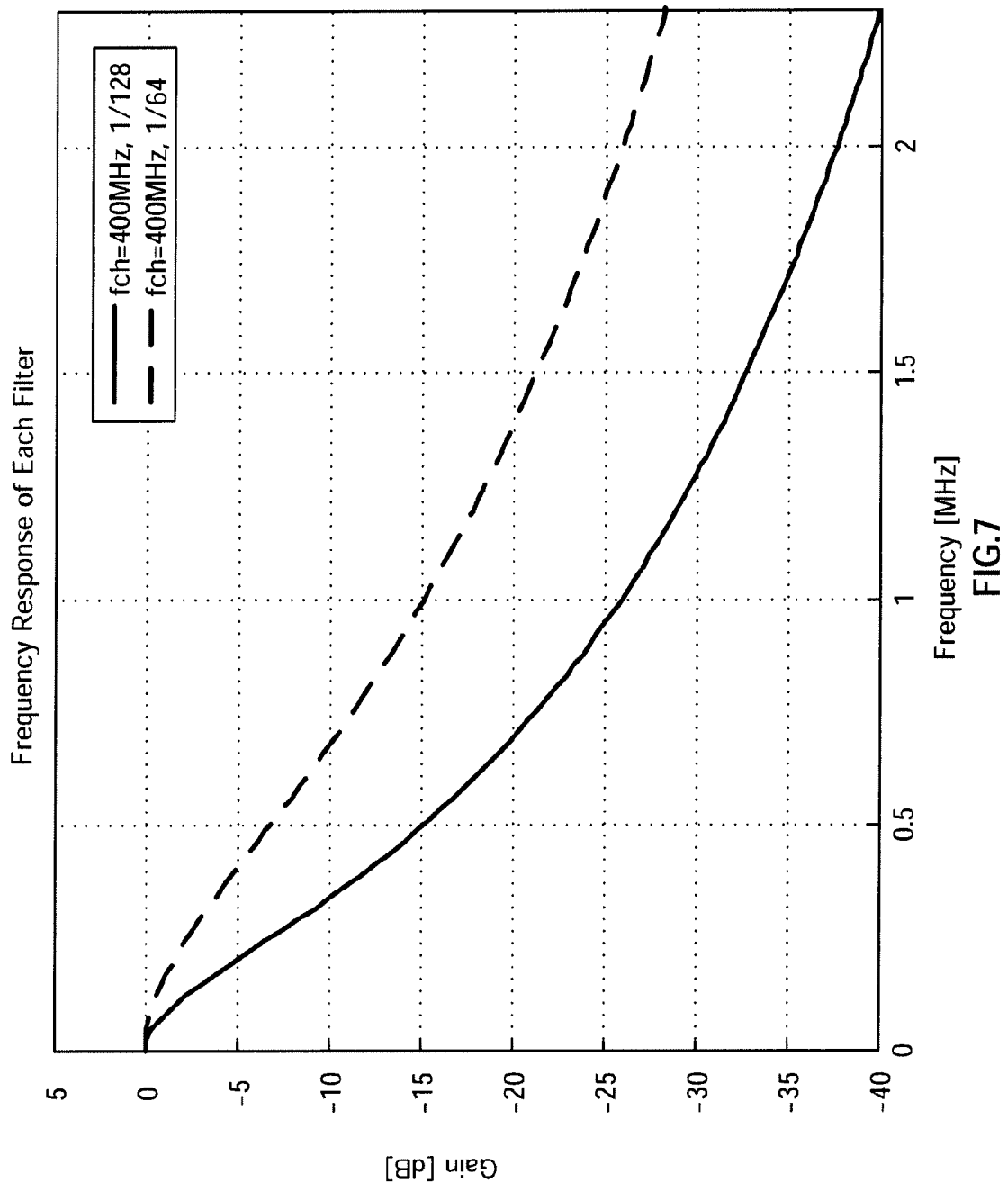
FIG. 7 is a diagram illustrating a variation in the frequency response characteristic of a DISCRETE TIME FREQUENCY CONVERTER shown in FIG. 6 according to a decimation rate.

Similar to DECIMATOR 211 shown in FIG. 4, DECIMATOR 311 decimates a discrete time input signal to convert a sampling rate into a low value, and outputs the resulting signal. In addition, DECIMATOR 311 has the filtering effect of removing high frequency components during the decimation process. Further, DECIMATOR 311 can change the rate of puncturing in response to a decimation rate control signal transmitted from CONTROLLER 330. When the decimation rate is changed, filtered frequency characteristics are also changed. For example, when the received channel frequency is 400 MHz and the decimation rate is switched between 1/128 and 1/64, the frequency response characteristic thereof is changed as represented by the solid line and the dotted line in FIG. 7.

FREQUENCY RESPONSE CHARACTERISTIC CORRECTOR 321 has the same basic configuration and operation as those of FREQUENCY RESPONSE CHARACTERISTIC CORRECTOR 222 according to Embodiment 2, but differs therefrom in that the details of the scaling process for frequency response characteristic change according to the decimation rate in DECIMATOR 311. Therefore, FREQUENCY RESPONSE CHARACTERISTIC CORRECTOR 321 includes REFERENCE CORRECTION CHARACTERISTIC STORAGE 322 and FREQUENCY RESPONSE CHARACTERISTIC SCALER 323 with different structures from those shown in FIG. 4.

REFERENCE CORRECTION CHARACTERISTIC STORAGE 322 differs from REFERENCE CORRECTION CHARACTERISTIC STORAGE 223 shown in FIG. 4 in that REFERENCE CORRECTION CHARACTERISTIC STORAGE 322 stores a plurality of reference correction characteristic data corresponding to the decimation rate switched by DISCRETE TIME FREQUENCY CONVERTER 310 and the data is read out, if necessary.

FREQUENCY RESPONSE CHARACTERISTIC SCALER 323 differs from FREQUENCY RESPONSE CHARACTERISTIC SCALER 224 shown in FIG. 4 in that FREQUENCY RESPONSE CHARACTERISTIC SCALER 323 reads out reference correction characteristic data corresponding to the decimation rate from REFERENCE CORRECTION CHARACTERISTIC STORAGE 322, and then performs a predetermined frequency scaling correction process on the read data. The operation thereof will be described in detail later.

CONTROLLER 330 differs from CONTROLLER 170 shown in FIG. 4 in that CONTROLLER 330 outputs a control signal to control the decimation rate in DECIMATOR 311.

In radio receiver 300 having the above-mentioned configuration, components performing different operations from those in Embodiment 2 will be described below.

CONTROLLER 330 outputs a predetermined control signal to LOCAL FREQUENCY OSCILLATOR 140, according to the received channel frequency which is acceptable by radio receiver 300, and also outputs a control signal for changing the decimation rate in DECIMATOR 311 according to the channel frequency.

Specifically, when the received channel frequency is in a range of 600 MHz or more and 800 MHz or less, CONTROLLER 330 controls DECIMATOR 311 to set the decimation rate to 1/128, similar to Embodiments 1 and 2. On the other hand, in the received channel frequency range of 400 MHz or more and less than 600 MHz, when the decimation rate is set to 1/128, as represented by the solid line in FIG. 7, the attenuation of frequency components in a modulated signal band in DECIMATOR 311 increases. Therefore, CONTROLLER 330 switches the decimation rate to 1/64 to reduce the attenuation of the frequency components in the modulated signal band, as represented by the dotted line in FIG. 7.

When the received channel frequency is in the range of 600 MHz or more and 800 MHz or less, FREQUENCY RESPONSE CHARACTERISTIC SCALER 323 reads out reference correction characteristic data $C_2(f')$ when the decimation rate is 1/128 from REFERENCE CORRECTION CHARACTERISTIC STORAGE 322, and corrects the scale of frequency characteristic based on the information related to the local frequency supplied from CONTROLLER 330, similar to Embodiment 2.

On the other hand, when the received channel frequency is the range of 400 MHz or more and less than 600 MHz, FREQUENCY RESPONSE CHARACTERISTIC SCALER 323 reads out reference correction characteristic data $C_3(f')$ when the decimation rate is 1/64 from REFERENCE CORRECTION CHARACTERISTIC STORAGE 322, and performs a scaling correction process represented by equation 11. Further, in this embodiment, the frequency response characteristic when the received channel frequency is 600 MHz are used as reference frequency response characteristic.

(Equation 11)

$$C_3(f') = \begin{cases} \dfrac{1}{H_3(f')} & \left(-\dfrac{1}{1200} \leq f' < +\dfrac{1}{1200}\right) \\ \dfrac{H_2(f')}{H_3(f')} & \left(-0.5 \leq f' < -\dfrac{1}{1200}, +\dfrac{1}{1200} \leq f' < +0.5\right) \end{cases} \quad [9]$$

Here, $H_3(f')$ indicates the frequency response characteristic of DECIMATOR 311 when the decimation rate is 1/64. When the decimation rate is 1/64, a sufficient amount of attenuation is not ensured in frequency ranges outside the modulated signal band (see FIG. 7). Therefore, in order to ensure a large amount of attenuation, correction is performed so that the same amount of attenuation as that in the frequency response characteristic when the decimation rate is 1/128 is obtained.

FREQUENCY RESPONSE CHARACTERISTIC SCALER 323 performs a correction process using frequency scaling, which is represented by equation 12, on the read correction characteristic data corresponding to equation 9, and outputs the obtained correction frequency response characteristic to TAP COEFFICIENT GENERATOR 225.

(Equation 12)

$$C_3'(f') = \begin{cases} \dfrac{1}{H_3\left(f' \times \dfrac{f_{s\,max}}{f_s}\right)} & \left(-\dfrac{1}{1200} \times \dfrac{f_{s\,max}}{f_s} \le f' < \\ & +\dfrac{1}{1200} \times \dfrac{f_{s\,max}}{f_s}\right) \\ H_2\left(f' \times \dfrac{f_{s\,max}}{f_s}\right) & \left(-0.5 \le f' < -\dfrac{1}{1200} \times \dfrac{f_{s\,max}}{f_s}, \\ H_3\left(f' \times \dfrac{f_{s\,max}}{f_s}\right) & +\dfrac{1}{1200} \times \dfrac{f_{s\,max}}{f_s} \le f' < +0.5\right) \end{cases} \quad [10]$$

Thereafter, TAP COEFFICIENT GENERATOR 225 and CORRECTION FILTER 221 perform the same processes as those in Embodiment 2.

Figure 8:
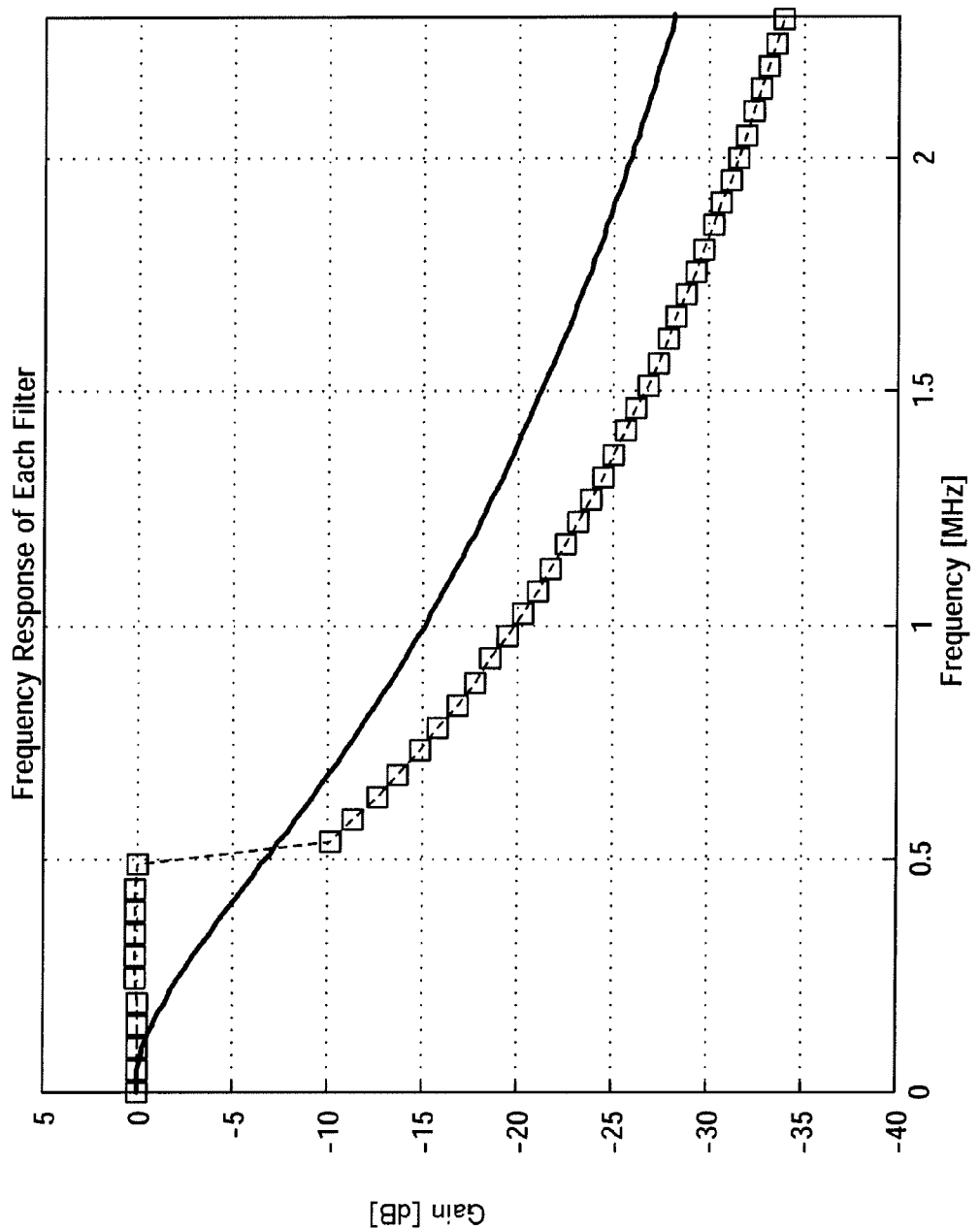
FIG. 8 is a diagram illustrating a frequency response characteristic correction process of a CORRECTION FILTER shown in FIG. 6.

In this way, when a channel frequency band of 400 MHz or more and less than 600 MHz is received, frequency scaling correction is performed based on equation 12. For example, when a signal with a channel frequency of 400 MHz is received, the correction effect of the frequency response characteristic represented by the solid line in FIG. 8 is obtained as represented by the square symbols.

As described above, according to the configuration and operation of the present invention, it is possible to more appropriately correct frequency response characteristic according to the decimation rate set in DECIMATOR 311, and thus provide a radio receiver that are applicable to systems having a wider received channel frequency bandwidth.

Furthermore, in this embodiment, as represented by equation 11, correction is performed so that the attenuation of frequency components in the modulated signal band is equal to that obtained when a different decimation rate is used in the ranges outside the modulated signal band. However, the present invention is not necessarily limited to this. For example, correction may be performed so that a larger amount of attenuation is ensured in frequency ranges outside the modulated signal band. In addition, even when the decimation rate is 1/128, correction may be performed so that a larger amount of attenuation is ensured in frequency ranges outside the modulated signal band. That is, correction may be performed so that a larger amount of attenuation is ensured in the ranges outside the modulated signal band and not subjected to correction, in the reference correction characteristics represented by equation 7 in Embodiment 2.

Further, in this embodiment, the decimation rate set in DECIMATOR 311 is determined in a unique association with the received channel frequency, but the present invention is not limited to this. For example, the decimation rate may be changed according to, for example, the usage of adjacent channel frequencies. In this case, changes that can be easily presumed by those skilled in the art may be made to FREQUENCY RESPONSE CHARACTERISTIC SCALER 323.

As described above, according to Embodiment 3, radio receiver 300 includes: DISCRETE TIME FREQUENCY CONVERTER 310 that samples a received signal at discrete times using a local frequency signal, thereby performing frequency conversion and decimation on the received signal, and outputs a discrete time analog signal with a sampling rate in accordance with the local frequency; A/D CONVERTER 150 that quantizes the discrete time analog signal into a digital value and outputs a received digital signal; CORRECTION FILTER 221 that performs a digital filtering process on the received digital signal using a tap coefficient value; and FREQUENCY RESPONSE CHARACTERISTIC CORRECTOR 321 that generates the tap coefficient value matching the sampling rate.

FREQUENCY RESPONSE CHARACTERISTIC CORRECTOR 321 includes: REFERENCE CORRECTION CHARACTERISTIC STORAGE 322 that stores frequency response characteristic matching a reference frequency; FREQUENCY RESPONSE CHARACTERISTIC SCALER 323 that corrects the scale of the frequency response characteristic matching the reference frequency, which are stored in REFERENCE CORRECTION CHARACTERISTIC STORAGE 322, in the frequency domain, based on information related to the local frequency matching the sampling rate; and TAP COEFFICIENT GENERATOR 225 that converts the corrected frequency response characteristic into an impulse response to generate a tap coefficient value for a digital filter. DISCRETE TIME FREQUENCY CONVERTER 310 has a filtering function during decimation, and REFERENCE CORRECTION CHARACTERISTIC STORAGE 322 stores frequency response correction characteristics that allow the gain of the received digital signal in the modulation bandwidth, which is obtained using the reference frequency and a local frequency corresponding to information related to each decimation rate in the DISCRETE TIME FREQUENCY CONVERTER, to be substantially constant. When the local frequency is not equal to the reference frequency, FREQUENCY RESPONSE CHARACTERISTIC SCALER 323 corrects the frequency response correction characteristic so that the gain of the received digital signal in the modulation bandwidth, which is obtained using the local frequency and a decimation rate corresponding to the local frequency, is substantially constant. CORRECTION FILTER 221 performs a correction filtering process using the tap coefficient value corresponding to the corrected frequency response correction characteristic.

In this way, in the configuration in which DISCRETE TIME FREQUENCY CONVERTER 310 has the filtering effect during frequency conversion and the decimation rate is changed according to the received channel frequency of a received signal, even when the frequency response characteristic of DISCRETE TIME FREQUENCY CONVERTER 310 vary according to the received channel frequency of the received signal, the frequency response correction characteristic are corrected so that the gain of a received digital signal in the modulation bandwidth, which is obtained using a local frequency and a decimation rate corresponding to the local frequency, is substantially constant, and a correction filtering process is performed using a tap coefficient corresponding to the corrected frequency response correction characteristic. Therefore, it is possible to perform a filtering process with frequency response characteristic that allow a substantially constant gain to be obtained up to the modulation bandwidth, regardless of the conversion of the sampling rate according to the received channel frequency, and thus it is possible reduce the influence of unnecessary removal of modulated signal bandwidth components. As a result, it is possible to improve reception characteristics and thus provide a radio receiver that are applicable to systems having a wide channel frequency bandwidth.

Furthermore, radio receiver 300 includes: LOCAL FREQUENCY OSCILLATOR 140 that generates the local frequency signal; and CONTROLLER 330 that controls the local frequency according to the channel frequency of the received signal, and controls the decimation rate in DISCRETE TIME FREQUENCY CONVERTER 310 in accordance with the control timing of the local frequency.

The present application is based on Japanese Patent Application No. 2005-348414, filed on Dec. 1, 2005, the entire content of which is expressly incorporated by reference herein.

INDUSTRIAL APPLICABILITY

The radio receiver according to the present invention includes a receiving processing system that performs discrete time frequency conversion to obtain signals with a sampling rate in accordance with a local frequency. When the receiving processing system is applied to a system having a wide received channel band, it is possible to improve reception characteristics.

The invention claimed is:

1. A radio receiver that receives a signal having one channel frequency among a plurality of channel frequencies by switching a local frequency signal to match the one channel frequency, the radio receiver comprising:
   a discrete time frequency converting section that outputs a discrete time analog signal of a sampling rate to match a first local frequency of the local frequency signal, the discrete time analog signal being generated by sampling the received signal at discrete times using the local frequency signal to match the one channel frequency of the received signal;
   an analog-to-digital converting section that quantizes the discrete time analog signal into a digital value to provide a digital signal based on the digital value;
   a digital filtering section; and
   a frequency response characteristic correcting section that generates a tap coefficient value to match the sampling rate and outputs the tap coefficient value to the digital filtering section, wherein:
   the digital filtering section performs a digital filtering process on the digital signal using the tap coefficient value to provide a digitally filtered signal and outputs the digitally filtered signal to a demodulating processing section that is located in a subsequent stage of the digital filtering section.

2. The radio receiver according to claim 1, wherein the frequency response characteristic correcting section comprises:
   a storing section that stores a reference frequency response characteristic comprising as a parameter a frequency normalized by a sampling rate to match a reference frequency, the reference frequency being one of the plurality of channel frequencies;
   a frequency response characteristic scaling section that corrects a scale of the reference frequency response characteristic in a frequency domain, based on the first local frequency to match the one channel frequency of the received signal; and
   a tap coefficient generating section that converts the corrected reference frequency response characteristic into an impulse response and generates the tap coefficient value for a digital filter.

3. The radio receiver according to claim 2, wherein:
   the discrete time frequency converting section has a filtering function in a decimation process;
   the storing section stores frequency response correction characteristics that allow a substantially constant gain of the digital signal in a modulation bandwidth, which is obtained using a second local frequency corresponding to the reference frequency;
   when the second local frequency is not equal to the reference frequency, the frequency response characteristic scaling section corrects a frequency response correction characteristic so that the gain of the digital signal in the modulation bandwidth, which is obtained using the second local frequency, is substantially constant; and
   the digital filtering section performs a correction filtering process using the tap coefficient value corresponding to the corrected frequency response correction characteristic.

4. The radio receiver according to claim 2, wherein:
   the discrete time frequency converting section has a filtering function during a decimation process;
   the storing section stores frequency response correction characteristics that allow a substantially constant gain of the digital signal in a modulation bandwidth, which is obtained using the reference frequency and a third local frequency corresponding to information related to each decimation rate in the discrete time frequency converting section;
   when the third local frequency is not equal to the reference frequency, the frequency response characteristic scaling section corrects a frequency response correction characteristic so that the gain of the received digital signal in the modulation bandwidth, which is obtained using the third local frequency and a decimation rate corresponding to the third local frequency, is substantially constant; and
   the digital filtering section performs a correction filtering process using the tap coefficient value corresponding to the corrected frequency response correction characteristic.

5. The radio receiver according to claim 1, further comprising:
   a local frequency oscillating section that generates the local frequency signal; and
   a control section that controls the first local frequency according to the one channel frequency of the received signal, and controls a decimation rate in the discrete time frequency converting section in accordance with a control timing of the first local frequency.

6. The radio receiver according to claim 2, wherein the storing section stores a first frequency response characteristic H1 (f') comprising as a parameter frequency f'=F/fs, the parameter frequency f' being obtained by normalizing a second frequency response characteristic H1 (f) by sampling rate fs to match the reference frequency, which is one of the plurality of channel frequencies, the first frequency response characteristic being stored as the reference frequency response characteristic.

7. The radio receiver according to claim 1, wherein the frequency response characteristic correcting section scales a reference frequency response characteristic in accordance with the sampling rate to generate the tap coefficient value.

8. The radio receiver according to claim 7, wherein the reference frequency response characteristic is scaled in accordance with a ratio of a reference sampling rate, used to generate the reference frequency response characteristic, and the sampling rate to generate the tap coefficient value.

* * * * *